(12) United States Patent
Furuta (10) Patent No.: US 9,057,646 B2
(45) Date of Patent: Jun. 16, 2015

(54) IMAGE FORMING APPARATUS FOR MEASURING A COLOR OF A MEASUREMENT IMAGE

(71) Applicant: Canon Kabushiki Kaisha, Tokyo (JP)

(72) Inventor: Yasutomo Furuta, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/727,375

(22) Filed: Dec. 26, 2012

(65) Prior Publication Data
US 2013/0162998 A1 Jun. 27, 2013

(30) Foreign Application Priority Data

Dec. 27, 2011 (JP) ................................. 2011-286206

(51) Int. Cl.
| | |
|---|---|
| B41J 29/393 | (2006.01) |
| G01J 3/46 | (2006.01) |
| B41J 2/045 | (2006.01) |
| H04N 1/407 | (2006.01) |

(52) U.S. Cl.
CPC .............. *G01J 3/462* (2013.01); *B41J 2/04558* (2013.01); *H04N 1/4076* (2013.01)

(58) Field of Classification Search
CPC ....... G01J 3/462; H04N 1/60; H04N 1/00013; H04N 1/00034; H04N 1/00023; H04N 1/0005
USPC .................... 347/9, 14, 16, 19, 101, 104, 105
See application file for complete search history.

(56) References Cited

U.S. PATENT DOCUMENTS

| | | | |
|---|---|---|---|
| 5,189,521 A * | 2/1993 | Ohtsubo et al. ................. 347/19 |
| 7,515,267 B2 * | 4/2009 | Ehbets et al. ................. 356/416 |
| 2008/0145089 A1 | 6/2008 | Takahashi | |
| 2008/0292360 A1 | 11/2008 | Hirai | |

FOREIGN PATENT DOCUMENTS

| | | |
|---|---|---|
| CN | 1495555 A | 5/2004 |
| CN | 1950208 A | 4/2007 |
| JP | 2004-086013 A | 3/2004 |
| JP | 2007-021799 A | 2/2007 |
| JP | 2010-079215 A | 4/2010 |

* cited by examiner

*Primary Examiner* — Juanita D Jackson
(74) *Attorney, Agent, or Firm* — Canon USA Inc. IP Division (57) ABSTRACT

An image forming apparatus includes an image forming unit configured to form a measurement image on a sheet, a measurement unit configured to measure the measurement image formed on the sheet to output a measurement value, a white reference plate provided at a position facing to the measurement unit, and a correction unit configured to correct the measurement value output from the measurement unit according to a distance from the measurement unit to the white reference plate in a case where the measurement image formed on the sheet is measured.

13 Claims, 9 Drawing Sheets

IMAGE FORMING APPARATUS FOR MEASURING A COLOR OF A MEASUREMENT IMAGE

BACKGROUND OF THE INVENTION

1. Field of the Invention

The present invention relates to an image forming apparatus having a function of measuring a color of a measurement image and a control method of the image forming apparatus.

2. Description of the Related Art

Image quality of an image forming apparatus includes parameters such as granularity, in-plane uniformity, character quality, color reproducibility (including color stability), and the like. Multi-color image forming apparatuses have become popular these days, and there is an opinion that the most important image quality parameter may be color reproducibility.

People have expectations of colors for objects (especially for human skin, blue sky, metal, or the like) based on their memories and experiences, and thus if a color of an object is different from their expectations beyond a tolerance level, they have feelings of strangeness. Such colors are referred to as memory colors, and image forming apparatuses are often demanded to provide the high reproducibility of the color when outputting photographs or the like.

A degree of demand for the color reproducibility (including stability) by the image forming apparatus has increased among office users who have the feelings of strangeness caused by color difference between an image on a monitor and a document image or a photographic image, and among graphic art users who pursue the color reproducibility of computer graphic (CG) images.

In such a situation, for example, Japanese Patent Application Laid-Open No. 2004-086013 discusses an image forming apparatus that reads a measurement image (patch image) formed on a sheet by a measurement unit (color sensor) disposed on a conveyance path of the sheet, to satisfy a demand for the color reproducibility by users. According to the image forming apparatus, based on a reading result of the patch image by the color sensor, feedback is given to process conditions including an exposure amount and development bypass to reproduce density, gradation, and color at a certain level.

However, in a color sensor according to Japanese Patent Application Laid-Open No. 2004-086013, accuracy for detecting a color is deteriorated due to factors such as an output fluctuation of a light source caused by a change of an environment temperature. Thus, it is considered that a white reference plate is disposed at a position facing to the color sensor, and the white reference plate is measured by the color sensor to correct a detection value of the color sensor.

More specifically, when a reflected light from a white reference plate is defined as W(λ) and a reflected light from a patch image is defined as P(λ), a spectral reflectance R(λ) of the patch image can be acquired by the following equation.

$$R(\lambda) = P(\lambda)/W(\lambda) \quad \text{(Equation 1)}$$

When the spectral reflectance of the patch image is acquired using the white reference plate, the white reference plate needs to be arranged at a position near a measurement surface of the color sensor to perform measurement. However, when the patch image is measured, the sheet on which the patch image is formed may hit the white reference plate to cause a jam. Thus, a movement mechanism may be provided for the white reference plate to move the white reference plate closer to the measurement surface of the color sensor when the white reference plate is measured and to move the white reference plate away from the measurement surface of the color sensor when the patch image is measured so that the sheet does not hit the white reference plate.

However, the movement of the white reference plate may deteriorate a positional accuracy and generate a deviation in a distance from the color sensor to the white reference plate. Accordingly, an amount of the reflected light from the white reference plate fluctuates, and thus a detection value of the color sensor cannot be accurately corrected.

SUMMARY OF THE INVENTION

The present invention relates to an image forming apparatus capable of accurately correcting a detection value of a color sensor regardless of positional accuracy of a white reference plate and a control method of the image forming apparatus.

According to an aspect of the present invention, an image forming apparatus includes an image forming unit configured to form a measurement image on a sheet, a measurement unit configured to measure the measurement image formed on the sheet to output a measurement value, a white reference plate provided at a position facing to the measurement unit, and a correction unit configured to correct the measurement value output from the measurement unit according to a distance from the measurement unit to the white reference plate in a case where the measurement image formed on the sheet is measured.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

[Image Forming Apparatus]

According to a first exemplary embodiment, a method for solving the above-described issue will be described with use of a laser beam printer of an electrophotographic method. As an example, the electrophotographic method is adopted as an image forming method. Further, the present invention can also be applied to an inkjet method and a sublimation method. This is because the present invention can be effectively applied to an image forming apparatus in which a thermochromism phenomenon may occur that causes a change in color of a measurement target depending on a temperature. In the inkjet method, an image forming unit for discharging ink to form an image on a sheet and a fixing unit (dry unit) for drying the ink are used.

Figure 1:
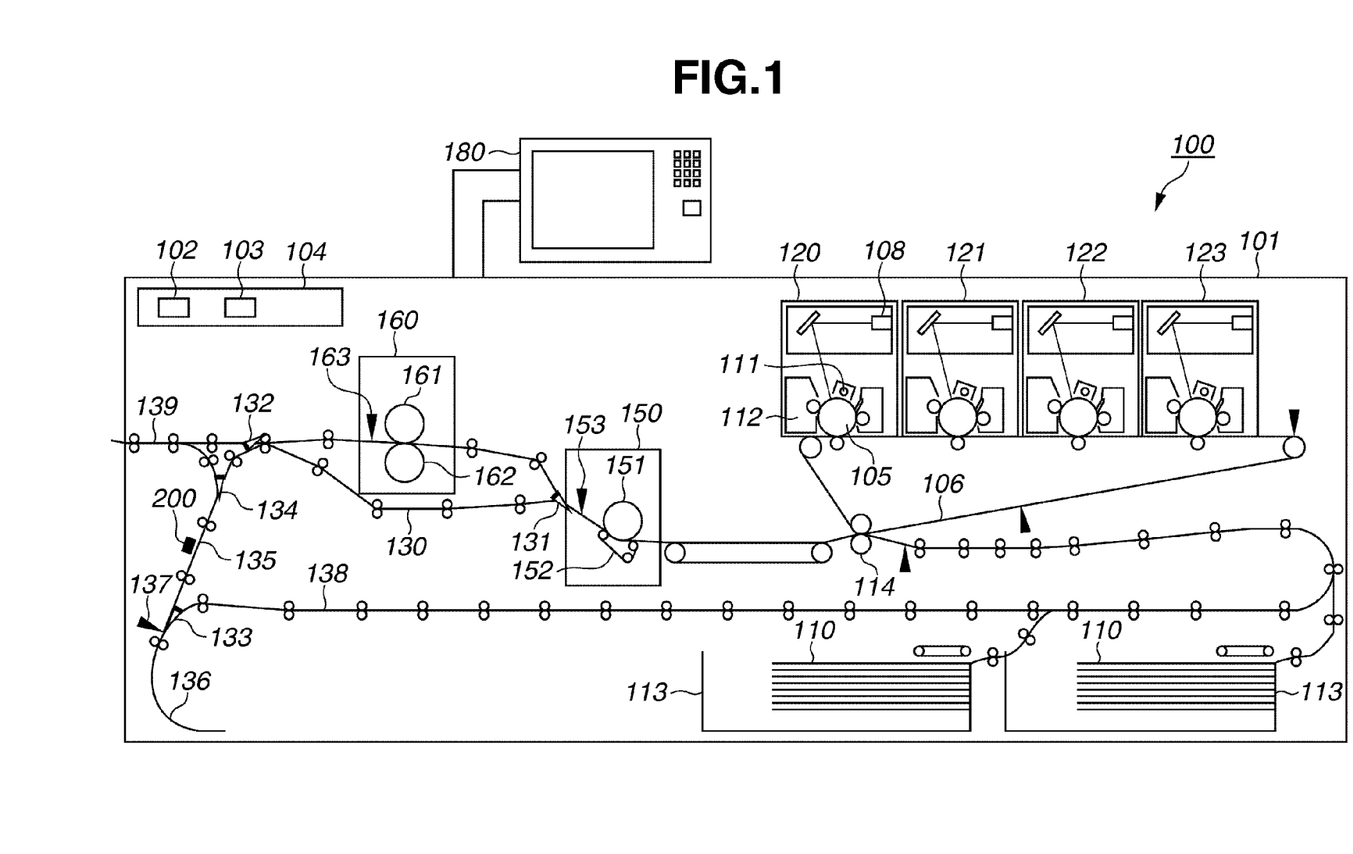
FIG. 1 is a cross sectional view illustrating a configuration of an image forming apparatus.

FIG. 1 is a cross sectional view illustrating a configuration of an image forming apparatus 100. The image forming apparatus 100 includes a housing 101. In the housing 101, each mechanism for making up an engine unit and a control board storage unit 104 are provided. The control board storage unit 104 stores an engine control unit 102 and a print controller 103 for controlling each printing processing (e.g., feeding sheet processing) performed by each engine unit mechanism.

As illustrated in FIG. 1, the engine unit is provided with four stations 120, 121, 122, and 123 corresponding to yellow, magenta, cyan, and black (YMCK) colors. The stations 120, 121, 122, and 123 are image forming units that transfer toner onto a sheet 110 to form an image thereon. Each station is formed of similar or identical components.

A photosensitive drum 105 is a type of image bearing member and is charged with a uniform surface potential by a primary charging device 111. On the photosensitive drum 105, a latent image is formed by a laser beam output from a laser 108. A developing device 112 develops the latent image with a color material (toner) to form a toner image. The toner image (a visible image) is transferred onto an intermediate transfer member 106. The visible image formed on the intermediate transfer member 106 is transferred by a transfer roller 114 onto the sheet 110 conveyed from a storage unit 113 (of which there may be a plurality).

A fixing processing mechanism according to the present exemplary embodiment includes a first fixing device 150 and a second fixing device 160 that fix the toner image transferred onto the sheet 110 by heating and pressing. The first fixing device 150 includes a fixing roller 151 for applying heat to the sheet 110, a pressing belt 152 for pressing and contacting the sheet 110 onto the fixing roller 151, and a first fixed sensor 153 for detecting completion of fixation. These rollers are hollow rollers and contain heaters.

The second fixing device 160 is disposed downstream of the first fixing device 150 in a conveyance direction of the sheet 110. The second fixing device 160 adds gloss to the toner image on the sheet 110 fixed by the first fixing device 150 and ensures fixation of the toner image. Similar to the first fixing device 150, the second fixing device 160 includes a fixing roller 161, a pressing roller 162, and a second fixed sensor 163. Some types of the sheet 110 do not need to be passed through the second fixing device 160. In such a case, to reduce energy consumption and time, the sheet 110 bypasses the second fixing device 160 via a conveyance path 130.

For example, when it is set to add gloss to the image on the sheet 110, or when the sheet 110 needs a large amount of heat as with thick paper, the sheet 110 passed through the first fixing device 150 is also conveyed through the second fixing device 160. On the other hand, when the sheet 110 is plain paper or thin paper, and when it is not set to add much gloss thereto, the sheet 110 is conveyed on the conveyance path 130 to bypass the second fixing device 160. Whether to convey the sheet 110 to the second fixing device 160 or to bypass the second fixing device 160 is controlled by switching a flapper 131.

A conveyance path switch flapper 132 is a guiding member for guiding the sheet 110 either to a conveyance path 135 or to a discharge path 139 to the outside of the apparatus. A leading edge of the sheet 110 that is guided to the conveyance path 135 is passed through a reverse sensor 137 and conveyed to a reverse unit 136. When the reverse sensor 137 detects a rear edge of the sheet 110, a conveyance direction of the sheet 110 is switched. The conveyance path switch flapper 133 is a guiding member for guiding the sheet 110 either to a conveyance path 138 for performing two-sided printing or to the conveyance path 135.

On the conveyance path 135, a color sensor 200 for detecting a measurement image (hereinbelow, referred to as a patch image) on the sheet 110 is disposed. Four color sensors 200 are aligned in a direction orthogonal to the conveyance direction of the sheet 110 to detect four rows of patch images. When color detection is instructed by an instruction from an operation unit 180, the engine control unit 102 performs density adjustment, gradation adjustment, multicolor adjustment, or the like.

The conveyance path switch flapper 134 is a guiding member for guiding the sheet 110 to the discharge path 139 to the outside of the apparatus 100.

[Color Sensor]

Figure 2:
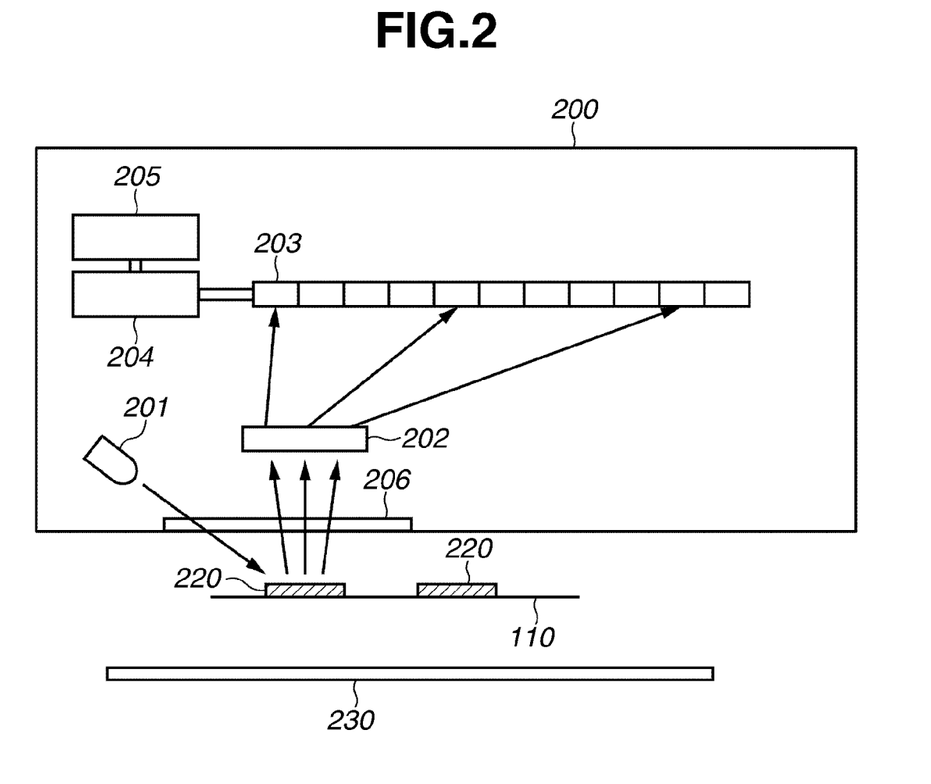
FIG. 2 illustrates a configuration of a color sensor.

FIG. 2 illustrates a configuration of the color sensor 200. Inside the color sensor 200, a white light emitting diode (LED) 201, a diffraction grating 202, a line sensor 203, a calculation unit 204, and a memory unit 205 are provided. The white LED 201 is a light-emitting element for irradiating a patch image 220 on the sheet 110 with light. The light reflected from the patch image 220 passes through a window 206 formed of a transparent member.

The diffraction grating 202 splits the light reflected from the patch image 220 into component wavelengths. The line sensor 203 is a light-detector provided with n of light-receiving elements for respectively detecting each wavelength of the light split by the diffraction grating 202. The calculation unit 204 performs various types of calculations based on a light intensity value of each pixel detected in the line sensor 203.

The memory 205 stores various types of data to be used by the calculation unit 204. The calculation unit 204 includes, for example, a spectral calculation unit for performing spectral calculation based on the light intensity value, and a Lab calculation unit for calculating a Lab value. A lens may be provided that collects the light emitted from the white LED 201 to the patch image 220 on the sheet 110 and also collects the light reflected from the patch image 220 to the diffraction grating 202.

Because of the change of the environmental temperature, the output of the white LED 201 fluctuates. To correct the fluctuation, a white reference plate 230 is movably provided at a position facing the window 206 of the color sensor 200.

FIG. 2 illustrates a state in which the white reference plate 230 is positioned at a predetermined separation from the window 206. However, when a measurement operation of the white reference plate 230 is actually performed, the white reference plate 230 is placed closer to the window 206 than the predetermined separation. In other words, when the measurement of the white reference plate 230 is performed, the white reference plate 230 is placed closer to the window 206 to enable the measurement of the reflected light from the white reference plate 230. Based on the reflected light, a detection value of the color sensor 200 is obtained and corrected. Hereinbelow, correction processing using the white reference plate 230 is referred to as calibration.

[Profile]

When performing multicolor correction processing, the image forming apparatus 100 generates a profile from a detection result of a patch image including a multicolor, and converts an input image using the profile to form an output image. The patch image in the multicolor is the patch image formed by superimposing a plurality of layers of toner in different colors.

With respect to the patch image including the multicolor, a halftone dot area ratio of each of four CMYK colors is changed into three levels (0%, 50%, and 100%), to form the patch images of all combinations of the halftone dot area ratio for each color.

According to the present exemplary embodiment, as a profile for realizing excellent color reproducibility, an International Color Consortium (ICC) profile is used that has been accepted by the market in recent years. However, the present invention can be realized by profiles other than the ICC profile. The present invention can be further applied to color separation tables in the Color Rendering Dictionary (CRD) adopted from PostScript Level 2 proposed by Adobe Systems Incorporated and in Photoshop.

When components are exchanged by a customer engineer, before a job requiring a high color-matching accuracy, or when color of a final output product needs to be known at a stage of design and planning, a user inputs an instruction to generate a color profile by operating the operation unit 180.

Figure 3:
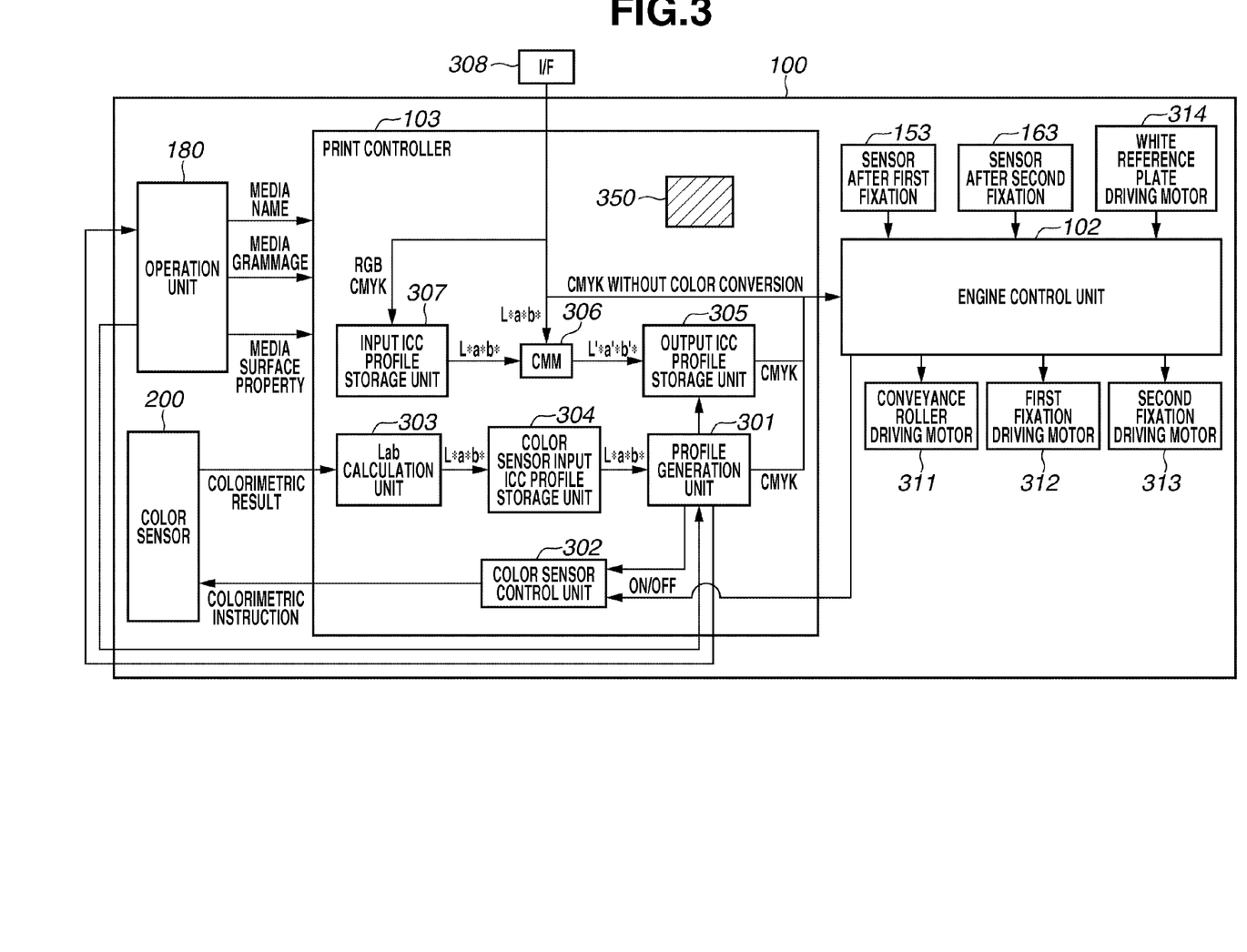
FIG. 3 is a block diagram illustrating a system configuration of the image forming apparatus.

The profile generation processing is performed by the print controller 103 illustrated in the block diagram in FIG. 3. The print controller 103 includes a central processing unit (CPU), and reads from the storage unit 350 a program for performing processing described with respect to the flowcharts of FIGS. 5 and 6 below to execute the program. In FIG. 3, an inside of the print controller 103 is illustrated with blocks for easy understanding of processing performed by the print controller 103.

When the operation unit 180 receives a profile generation instruction, a profile generation unit 301 outputs a CMYK color chart that is an International Organization for Standardization (ISO) 12642 test form to the engine control unit 102 without using the profile. The profile generation unit 301 transmits a measurement instruction to a color sensor control unit 302. The engine control unit 102 controls the image forming apparatus 100 to perform processes such as charging, exposure, development, transfer, and fixation. By performing these processes, the ISO12642 test form is formed on the sheet 110.

The color sensor control unit 302 controls the color sensor 200 to measure the ISO12642 test form that is printed on the sheet 110. The color sensor 200 senses the printed test form and outputs spectral reflectance data (colorimetric data) as the measurement value to a Lab calculation unit 303 of the print controller 103. The Lab calculation unit 303 converts the spectral reflectance data into L*a*b* data and outputs the L*a*b* data to the profile generation unit 301 via a color sensor input ICC profile storage unit 304 (the latter acting as a buffer storage means from the color sensor). The Lab calculation unit 303 may convert the spectral reflectance data into the International Commission on Illumination (CIE) 1931 XYZ color space, which is a device-independent color space signal.

The profile generation unit 301 generates an output ICC profile based on a relationship between a CMYK color signal output from the profile generation unit 301 to the engine control unit 102 and the L*a*b* data output from the Lab calculation unit 303 to the profile generation unit 301. An output ICC profile storage unit 305 then stores this generated output ICC profile.

The ISO12642 test form includes patches of the CMYK color signal which cover a color reproduction region that can be output by a general copy machine. Thus, the profile generation unit 301 generates a color conversion table based on a relationship between each color signal value and a measured L*a*b* value. In other word, a conversion table of CMYK to Lab is generated. Based on the conversion table, a reverse conversion table is generated.

When the profile generation unit 301 receives a profile generation command from a host computer via an interface (I/F) 308, the profile generation unit 301 outputs the generated output ICC profile to the host computer via the I/F 308. Thus, the host computer can perform color conversion corresponding to the ICC profile using an application program.

A conveyance roller driving motor 311 drives the transfer roller 114. A first fixation driving motor 312 drives the first fixing device 150, and a second fixation driving motor 313 drives the second fixing device 160. Those motors are controlled by the engine control unit 102. The engine control unit 102 controls a white reference plate driving motor 314 for moving the white reference plate 230 toward the window 206 of the color sensor 200.

[Color Conversion Processing]

In the color conversion of the general color output, red, green, and blue (RGB) signal values input from a scanner unit via the I/F 308 and an image signal input assuming a standard printing CMYK signal value such as Japan Color are transmitted to an input ICC profile storage unit 307 as an external input. The input ICC profile storage unit 307 performs RGB to L*a*b* conversion or CMYK to L*a*b* conversion according to the image signal input from the I/F 308. The input ICC profile stored in the input ICC profile storage unit 307 includes a plurality of look-up tables (LUT).

These LUT may include, for example, a one-dimensional LUT for controlling gamma of an input signal, a multicolor LUT referred to as "direct mapping", and a one-dimensional LUT for controlling a gamma value of generated conversion data. The input image signal is converted from the device-dependent color space into device-independent L*a*b* data using these LUTs.

The image signal converted into the L*a*b* coordinates is input to a color management module (CMM) 306. The CMM 306 performs various types of color conversion. For example, the CMM 306 performs GAMUT conversion for mapping a mismatch in a reading color space of the scanner unit as an input device and an output color reproduction range of the image forming apparatus 100 as an output device. Further, the CMM 306 performs the color conversion for adjusting mismatch of types of light sources (also, referred to as the mismatch of color temperature setting) for observing the light source type at the time of input and an output object.

As described above, the CMM 306 converts the L*a*b* data into L'*a'*b'* data, and outputs the L'*a'*b'* data to the output ICC profile storage unit 305. The profile generated by the measurement is stored in the output ICC profile storage unit 305. Therefore, the output ICC profile storage unit 305 performs the color conversion on the L'*a'*b'* data by the newly generated ICC profile (using the reverse-engineered conversion table based on the ICC profile of the profile generation unit 301), converts the L'*a'*b'* data into a CMYK signal depending on an output device, and then outputs the CMYK signal to the engine control unit 102.

Figure 4:
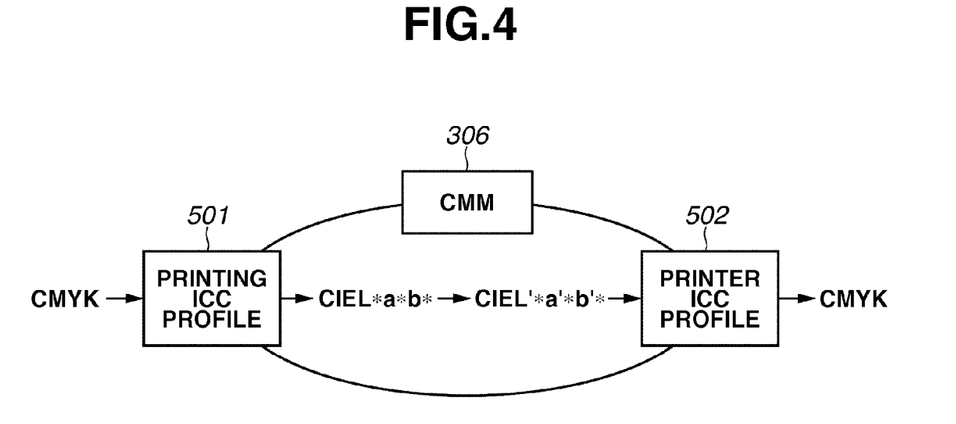
FIG. 4 is a schematic view of a color management environment.

As illustrated in FIG. 3, the CMM 306 is separated from the input ICC profile storage unit 307 and the output ICC profile storage unit 305. However, as illustrated in FIG. 4, the CMM 306 is more specifically a module for controlling color management and performing color conversion using an input profile (printing ICC profile 501) and an output profile (printer ICC profile 502).

The basic operations of the measurement of the spectral reflectance by the color sensor 200, the calculation of the color value, the generation of the ICC profile, and the color conversion processing are described above. A method for calculating the spectral reflectance $R(\lambda)$ of the patch image after the white correction according to the position of the white reference plate 230 when the white reference plate 230 is moved closer to the color sensor 200 will be described in detail below.

[Correction Method of Spectral Reflectance]

Figure 5:
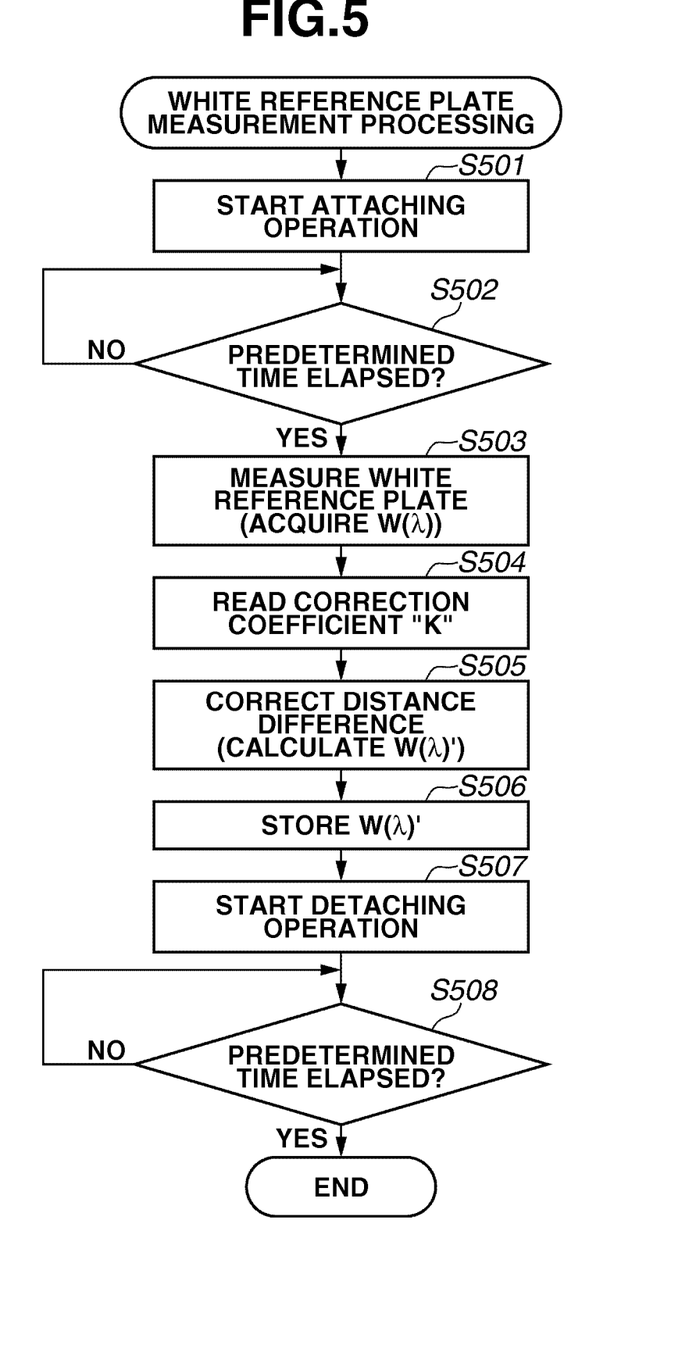
FIG. 5 is a flowchart illustrating measurement processing of a white reference plate according to a first exemplary embodiment.

FIG. 5 is a flowchart illustrating measurement processing of the white reference plate 230 according to a first exemplary embodiment. The processing in the flowchart is performed by the print controller 103. The image forming apparatus 100 is controlled by the engine control unit 102 according to an instruction from the print controller 103. The processing in the flowchart is performed at timing when the sheet 110 is not placed between the white reference plate 230 and the color sensor 200 in response to the instruction from the operation unit 180 to perform the multicolor correction processing.

In step S501, the print controller 103 starts to drive the white reference plate driving motor 314 to move the white reference plate 230 closer to the window 206 of the color sensor 200. In step S502, the print controller 103 waits until a time elapses during which is moved the white reference plate 230 closer to the window 206 of the color sensor 200. At this time, the white reference plate 230 moves to the place at which sheet passes.

In step S503, the print controller 103 measures the reflected light from the white reference plate 230 using the color sensor 200 and acquires the spectral reflectance $W(\lambda)$ of the white reference plate 230. In step S504, the print controller 103 reads a correction coefficient K previously stored in the storage unit 350. The correction coefficient K is used to correct an error of the spectral reflectance generated by a positional error of the white reference plate 230, and is previously calculated and stored in the storage unit 350. A specific calculation method of the correction coefficient K will be described below.

The print controller 103 corrects the spectral reflectance $W(\lambda)$ according to a distance from the color sensor 200 to the white reference plate 230. More specifically, in step S505, the print controller 103 calculates the corrected spectral reflectance $W(\lambda)'$ of the white reference plate 230 using the following equation.

$$W(\lambda)' = W(\lambda) \times \text{Correction Coefficient } K \quad \text{(Equation 2)}$$

Then in step S506, the print controller 103 stores the calculated spectral reflectance $W(\lambda)'$ in the storage unit 350.

In step S507, the print controller 103 starts to drive the white reference plate driving motor 314 to move the white reference plate 230 away from the window 206 of the color sensor 200. In step S508, the print controller 103 waits until a time elapses during which the white reference plate 230 is moved away from the window 206 of the color sensor 200. Then, the processing in this flowchart is ended.

Figure 6:
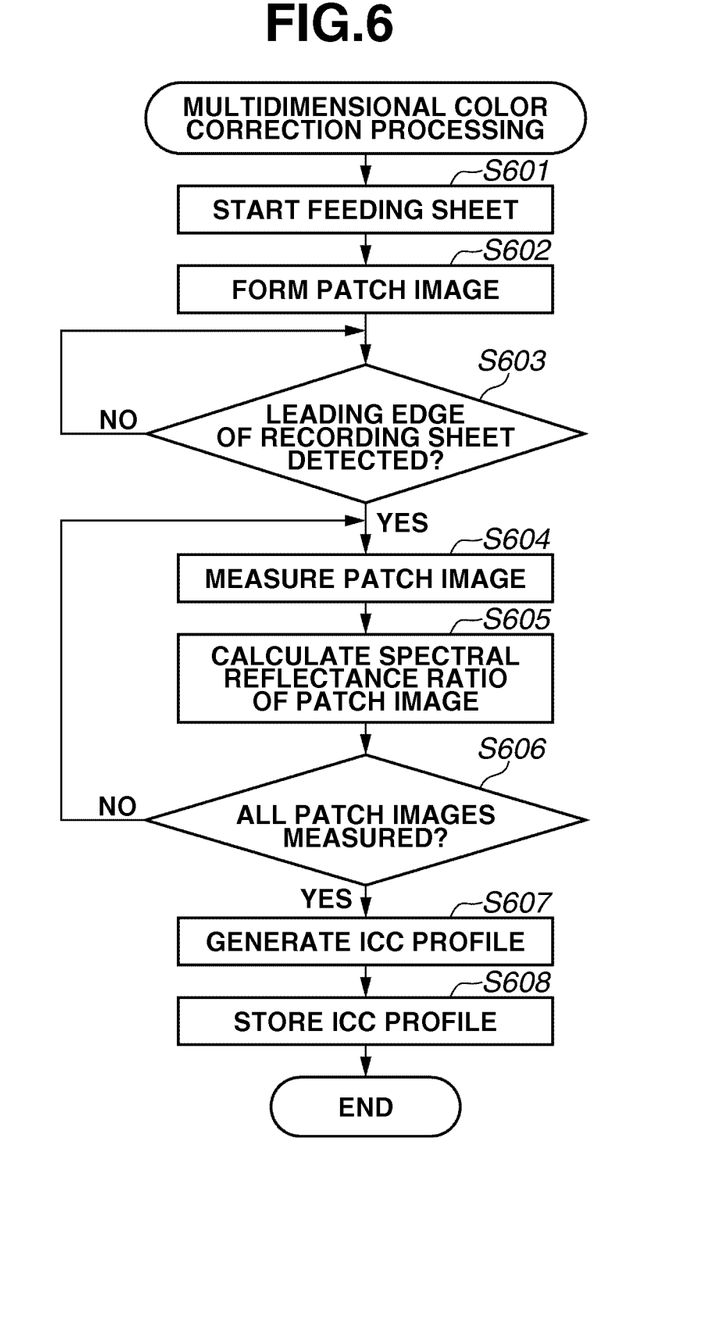
FIG. 6 is a flowchart illustrating measurement processing of a patch image according to the first exemplary embodiment.

FIG. 6 is a flowchart illustrating the measurement processing of the patch image 220 according to the first exemplary embodiment. The processing in the flowchart is performed by the print controller 103 following the above-described measurement processing of the white reference plate 230. The image forming apparatus 100 is controlled by the engine control unit 102 according to an instruction from the print controller 103.

In step S601, the print controller 103 starts to feed the sheets 110 from the storage unit 113. In step S602, the print controller 103 forms the patch image 220 on the sheet 110.

In step S603, the print controller 103 waits until the leading edge of the sheet 110 is detected based on the output from the color sensor 200. At this point, the print controller 103 always monitors the output of the color sensor 200, and determines a timing when a received light amount is increased as the timing when the leading edge of the sheet 110 is detected. A sensor for detecting the leading edge of the sheet 110 may be provided separately from the color sensor 200.

In step S604, the print controller 103 measures the spectral reflectance $P(\lambda)$ of the reflected light from the patch image 220 on the sheet 110 using the color sensor 200. In step S605, the print controller 103 calculates the spectral reflectance $R(\lambda)$ of the patch image 220 after white is corrected using equation (3) below with the use of the spectral reflectance $P(\lambda)$ of the patch image 220 measured in step S604 and the corrected spectral reflectance $W(\lambda)'$ of the white reference plate 230 calculated in step S505.

$$R(\lambda) = P(\lambda) / W(\lambda)' \quad \text{(Equation 3)}$$

In step S606, the print controller 103 repeatedly performs the processing in steps S604 and S605 until the measurement of all the patch images 220 is completed. If the measurement of all the patch images 220 is completed (YES in step S606), in step S607, the print controller 103 converts the spectral reflectance $R(\lambda)$ into the color data (L*a*b*), and generates the ICC profile by the above-described processing. In step S608, the print controller 103 stores the generated ICC profile in the storage unit 350. Then, the processing in this flowchart is ended.

Figure 7A:
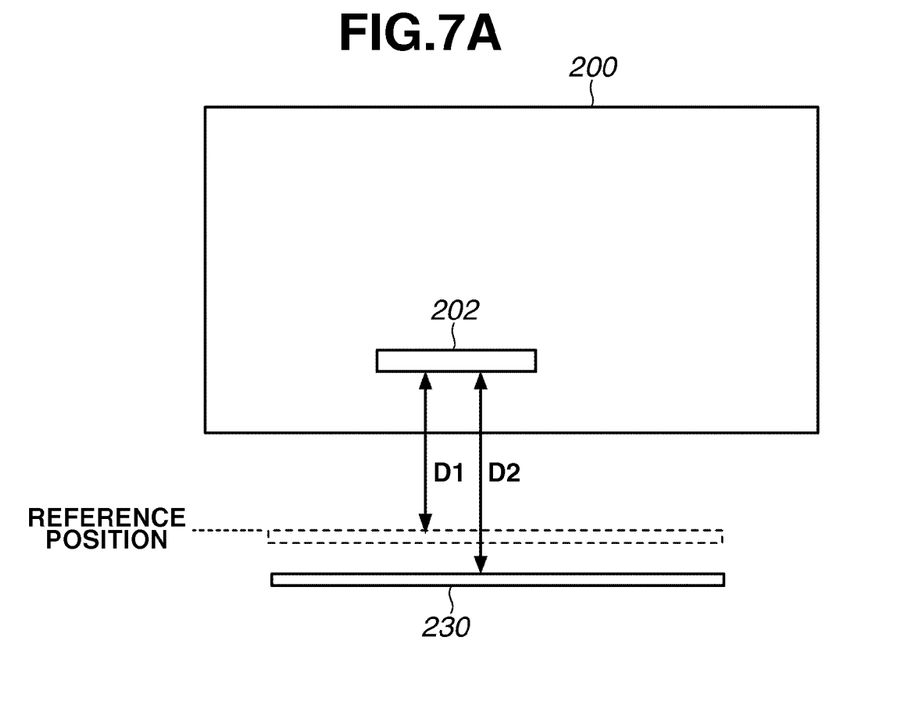
FIGS. 7A and 7B illustrate a change of an amount of reflected light from a white reference plate with respect to a deviation from a reference position of the white reference plate.
Figure 7B:
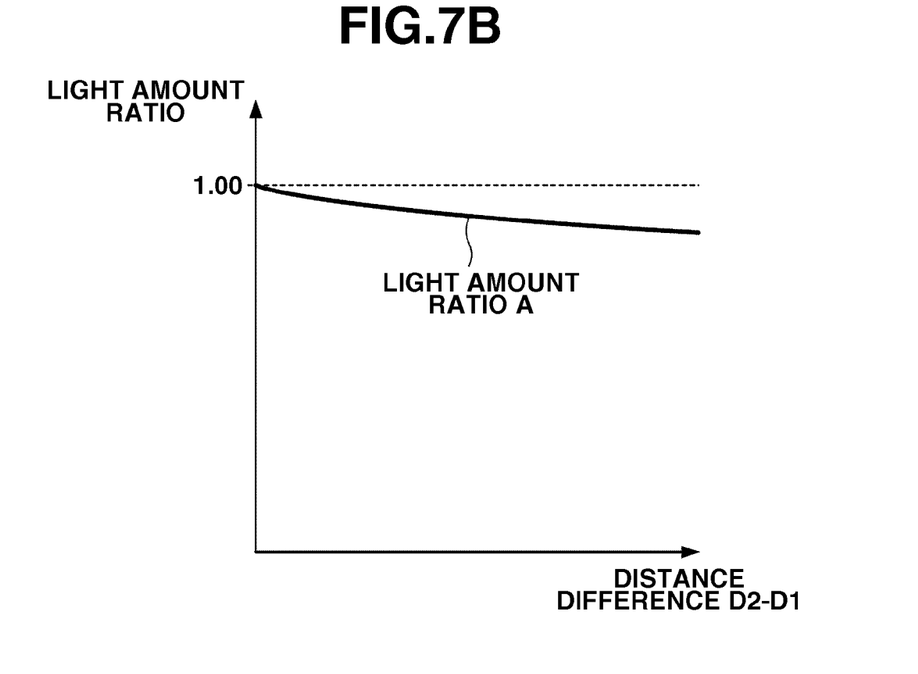

FIGS. 7A and 7B illustrate a change of the amount of the reflected light from the white reference plate 230 with respect to a deviation from a reference position of the white reference plate 230.

As illustrated in FIG. 7A, when the white reference plate 230 is moved toward the color sensor 200, the position of the white reference plate 230 may be slightly shifted from an original reference position due to an influence of variation of assembly accuracy or the like. If there is no deviation, a distance D1 is acquired between the white reference plate 230 and the diffraction grating 202 in the color sensor 200. However, taking a deviation into account, the distance is actually shifted to a position of a distance D2. The reference position is set to a position of the patch image 220 on the sheet 110 when the patch image 220 passes the color sensor 200 in its normal passage along a conveyor. The deviation is a result of the adjustment of the distance between the white reference plate 230 and the color sensor 200 compared with the distance between the patch image 220 and the color sensor 200.

When a deviation does occur at the position of the white reference plate 230, the amount of the reflected light from the white reference plate 230 is decreased as the white reference plate 230 is moved away from the color sensor 200. Therefore, as illustrated in FIG. 7B, the larger the deviation between the white reference plate 230 and the reference position (distance difference D2−D1), the lower the light amount ratio A becomes.

The light amount ratio A is a ratio defining the amount of the reflected light when the white reference plate 230 is placed at the reference position and is calculated as follows. When the white reference plate 230 is placed at a position giving a distance D1 (i.e. it is placed at the reference position), the amount of the reflected light is defined as P1. When the white reference plate 230 is placed at a position a distance D2 from the diffraction grating 202, the amount of the reflected light is defined as P2, and then the light amount ratio A can be acquired by the following equation 4.

Light Amount Ratio $A = P2/P1$ (Equation 4)

The correction coefficient K used in the above-described step S505 can be acquired by the following equation 5.

Correction Coefficient $K = 1/\text{Light Amount Ratio } A$ (Equation 5)

The amount (e.g. the intensity) of reflected light P1 when the white reference plate 230 is placed at the position of the distance D1 (the reference position) is a value determined by the design of the apparatus and can therefore be known in advance. Therefore, if the amount of the reflected light P2 is measured when the white reference plate 230 is placed at the position distance D2 from the diffraction grating 202, the light amount ratio A and the correction coefficient K can be acquired. The correction coefficient K is calculated when the image forming apparatus is assembled in the factory, and stored in the storage unit 350. The correction coefficient K stored as described above is read and used in step S504 in FIG. 5.

As described above, according to the first exemplary embodiment, the spectral reflectance $W(\lambda)$ of the white reference plate 230 is corrected to calculate $W(\lambda)'$ according to the distance from the color sensor 200 to the white reference plate 230. Then, using the corrected spectral reflectance $W(\lambda)'$, the spectral reflectance of the patch image 220 is corrected, and then the corrected spectral reflectance $R(\lambda)$ of the patch image 220 is calculated. By performing such control, according to the first exemplary embodiment, the detection value of the color sensor 200 can be accurately corrected regardless of positional accuracy of the white reference plate 230.

According to the first exemplary embodiment, a spectral reflectance $W(\lambda)$ of a white reference plate 230 is corrected. According to a second exemplary embodiment, a spectral reflectance $W(\lambda)$ is not corrected, but an amount of emitted light of a white LED 201 provided to a color sensor 200 is corrected. The second exemplary embodiment will be described below. However, descriptions of configurations similar to those in the first exemplary embodiment will not be repeated.

[Correction Method of Light Amount of White LED]

Figure 8:
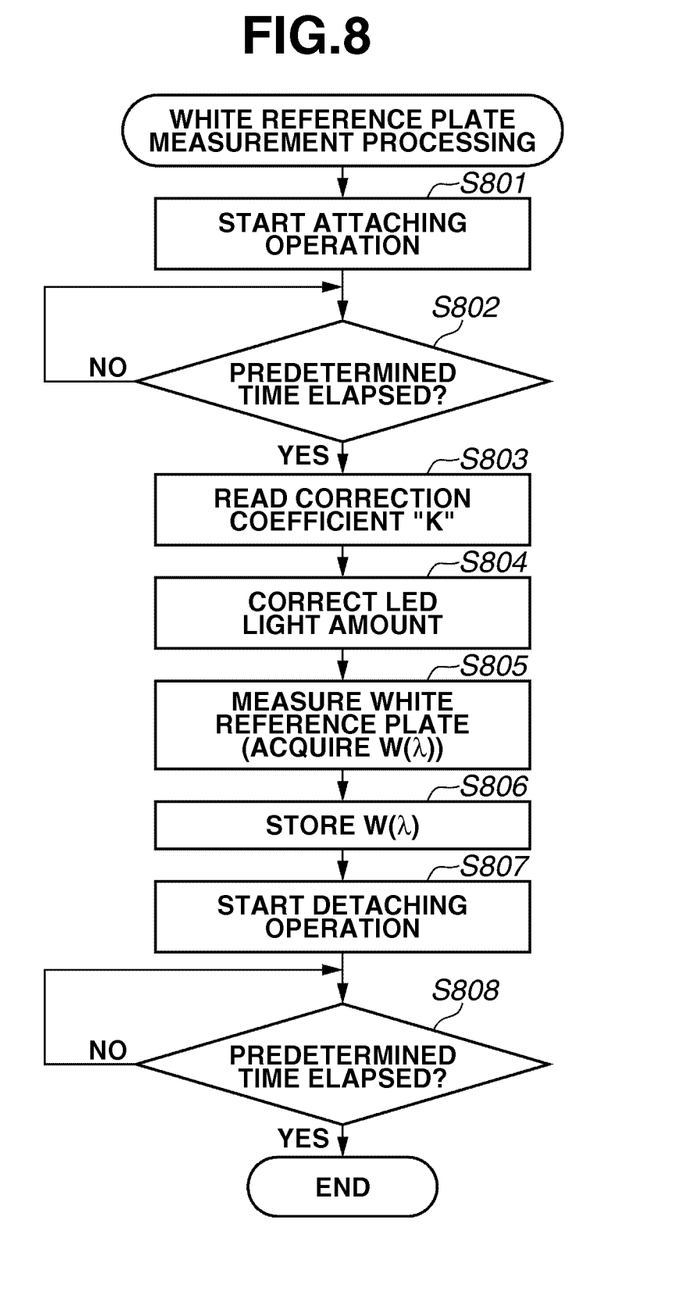
FIG. 8 is a flowchart illustrating measurement processing of a white reference plate according to a second exemplary embodiment.

FIG. 8 is a flowchart illustrating measurement processing of the white reference plate 230 according to the second exemplary embodiment. The processing in the flowchart is performed by the print controller 103. The image forming apparatus 100 is controlled by the engine control unit 102 according to an instruction from the print controller 103. The processing in the flowchart is performed at a time when the sheet 110 is not placed between the white reference plate 230 and the color sensor 200 in response to the instruction from the operation unit 180 to perform the multicolor correction processing.

In step S801, the print controller 103 starts to drive the white reference plate driving motor 314 to move the white reference plate 230 closer to the window 206 of the color sensor 200. In step S802, the print controller 103 waits until a time elapses during which the white reference plate 230 is moved closer to the window 206 of the color sensor 200.

In step S803, the print controller 103 reads a correction coefficient K previously calculated and stored in the storage unit 350. A method for acquiring the correction coefficient K is similar to that of the first exemplary embodiment. In step S804, the print controller 103 corrects the amount of the emitted light of the white LED 201 using the following equation 6.

Corrected LED Light Amount = LED Light Amount before Correction × Correction Coefficient $K$ (Equation 6)

The light amount correction methods include a method for controlling a driving current of the white LED 201 which controls the peak light amount and a method for adjusting an integrated light amount by controlling a light-emitting time of the white LED 201. Either one of the methods or another method may be used as long as the resultant output light is corrected according to equation 6.

In step S805, the print controller 103 causes the white LED 201 to emit the corrected amount of the LED light, measures the reflected light from the white reference plate 230 by the color sensor 200, and acquires the spectral reflectance $W(\lambda)$ of the white reference plate 230. In step S806, the print controller 103 stores the acquired spectral reflectance $W(\lambda)$ in the storage unit 350.

In step S807, the print controller 103 starts to drive the white reference plate driving motor 314 to move the white reference plate 230 away from the window 206 of the color sensor 200. In step S808, the print controller 103 waits until a time elapses during which the white reference plate 230 is moved away from the window 206 of the color sensor 200. Then, the processing in this flowchart is ended.

A flowchart for the measurement processing of the patch image 220 according to the second exemplary embodiment is basically the same as the flowchart illustrated in FIG. 6, however, the spectral reflectance $R(\lambda)$ of the patch image 220 after the white correction is calculated based on the Equation 3 in step S605.

The method for controlling the light amount of the white LED 201 when the measurement of the white reference plate 230 is performed is described as above. However, according to the present exemplary embodiment, a method for controlling the light amount of the white LED 201 when the measurement of the patch image 220 is performed may also be used. The light amount of the white LED 201 in this case is set based on the following equation.

Corrected LED Light Amount = LED Light Amount before Correction / Correction Coefficient $K$ (Equation 7)

In this case, the light amount is not controlled when the measurement of the white reference plate 230 is performed, but when the measurement of the patch image 220 is performed in step S604 illustrated in FIG. 6, the light amount may be controlled after the white LED 201 is turned on.

As described above, according to the second exemplary embodiment, the amount of the emitted light of the white LED 201 is corrected according to the distance from the color sensor 200 to the white reference plate 230. By performing such control, according to the second exemplary embodiment, the detection value of the color sensor 200 can be accurately corrected regardless of positional accuracy of the white reference plate 230.

Since the distance from the color sensor 200 to the patch image 220 on the sheet 110 fluctuates depending on a paper thickness of the sheet 110, the correction amount may be adjusted by changing the correction coefficient K according to a sheet type of the sheet 110. The sheet type of the sheet 110 may be set via the operation unit 180.

Further, according to the exemplary embodiment, in a case where a color value is detected during the multicolor correction processing, multicolor patch images are formed on the sheet 110. On the other hand, in a case where a density value is detected during the density adjustment and the gradation adjustment, single color patch images are formed on the sheet 110.

Figure 9:
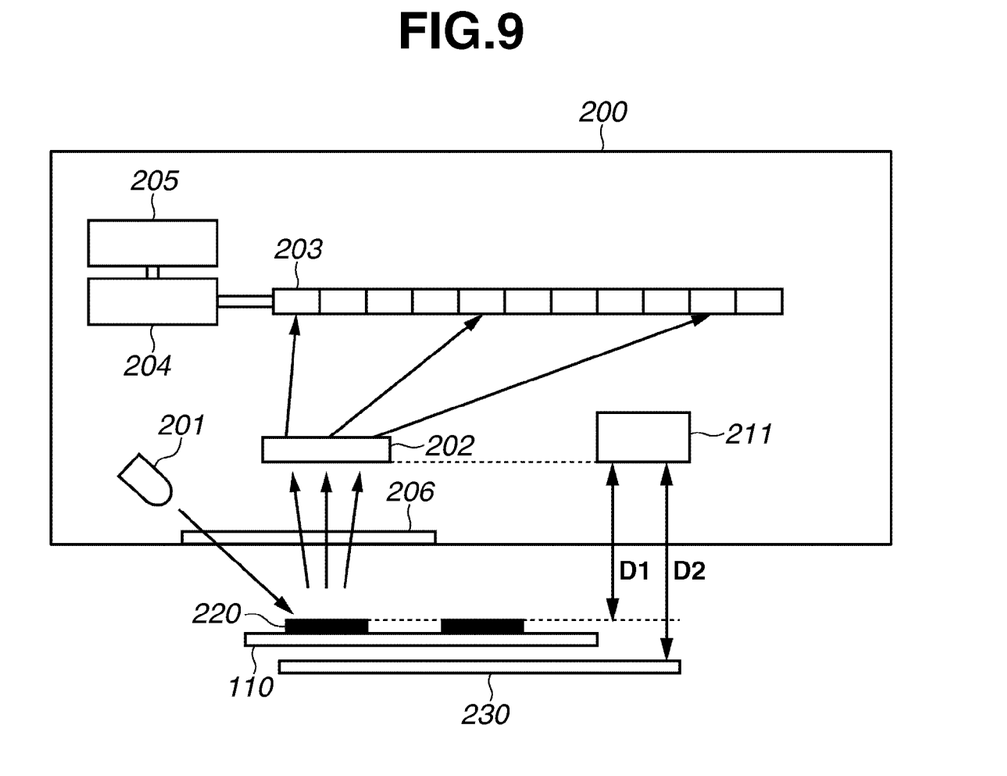
FIG. 9 illustrates a distance measuring sensor provided in a color sensor.

Further, as illustrated in FIG. 9, the distance measuring sensor 211 may be provided in the color sensor 200 to measure the distance D1 to the patch image 220 and the distance D2 to the white reference plate 230 when the white reference plate 230 is moved closer to the color sensor 200. If the distance difference D2−D1 is calculated, the light amount ratio A can be calculated with reference to FIG. 7B, and thus, the correction coefficient K can be calculated using the above-described Equation 5.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-286206 filed Dec. 27, 2011, which is hereby incorporated by reference herein in its entirety.

What is claimed is:

1. An image forming apparatus comprising:
an image forming unit configured to form a measurement image on a sheet;
a measurement unit, which includes a light-emitting unit configured to irradiate the measurement image with light and a receiving unit configured to receive reflected light from the measurement image, configured to measure the measurement image formed on the sheet to output a spectral reflectance, by irradiating the measurement image using the light-emitting unit and by receiving the reflected light from the measurement unit using the receiving unit;
a white reference plate provided at a position facing to the measurement unit;
a movement unit configured to move the white reference plate;
a distance measuring unit configured to measure a distance from the measurement unit to the white reference plate; and
a correction unit configured to correct an amount of emitted light of the light-emitting unit according to the distance measured by the distance measuring unit.

2. The image forming apparatus according to claim 1, wherein the measurement unit is configured to measure light reflected from the white reference plate to output a first spectral reflectance, and
wherein the correction unit is configured to correct the first spectral reflectance according to the distance from the measurement unit to the white reference plate to calculate a second spectral reflectance.

3. The image forming apparatus according to claim 2, wherein the correction unit is configured to correct the spectral reflectance output from the measurement unit based on the second spectral reflectance.

4. The image forming apparatus according to claim 1, further comprising:
a first calculation unit configured to calculate a density value based on the spectral reflectance; and
a second calculation unit configured to calculate a color value based on the spectral reflectance.

5. The image forming apparatus according to claim 1, wherein the image forming unit is configured to form a measurement image in a single color in a case where a density value is detected, and form a measurement image on which a plurality of colors are superimposed in a case where a color value is detected.

6. The image forming apparatus according to claim 1, wherein the correction unit is configured to set a correction amount based on a measurement result of the distance measuring unit, and correct the amount of emitted light of the light-emitting unit according to the set correction amount.

7. The image forming apparatus according to claim 1, wherein the correction unit is configured to calculate a spectral reflectance $R(\lambda)$ of the measurement image after white correction is performed based on the following equations in which $$W(\lambda)'=W(\lambda) \times K; \text{ and}$$

$$R(\lambda)=P(\lambda)/W(\lambda)', \text{ wherein}$$

$W(\lambda)$ is a spectral reflectance of the white reference plate;
$W(\lambda)'$ is a corrected spectral reflectance of the white reference plate;
K is a correction coefficient; and
$P(\lambda)$ is a spectral reflectance of the measurement image.

8. The image forming apparatus according to claim 7, wherein the correction unit is configured to calculate a correction coefficient K based on the following equations:

$$A=P2/P1; \text{ and}$$

$$K=1/A, \text{ in which}$$

A is a light amount ratio;
P1 is an amount of reflected light in a case where the white reference plate is placed at a first position; and
P2 is an amount of reflected light in a case where the white reference plate is placed at a second position further away from the measurement unit than the first position.

9. The image forming apparatus according to claim 1,
wherein the image forming unit is configured to form the image by transferring toner onto the sheet, and
wherein the image forming apparatus further comprises a fixing unit configured to heat the toner and fix the toner onto the sheet.

10. The image forming apparatus according to claim 1,
wherein the image forming unit configured to form the image on the sheet by discharging ink, and
wherein the image forming apparatus further comprises a dry unit configured to dry the ink.

11. The image forming apparatus according to claim 1,
wherein the distance measurement unit measures a distance between the measurement unit and the white reference plate when the light-emitting unit irradiates light to the white reference plate, and
wherein the correction unit corrects the amount of emitted light of the light-emitting unit according to the distance measured by the distance measuring unit when the light-emitting unit irradiated the white plate with light.

12. The image forming apparatus according to claim 1,
wherein the distance measurement unit measures a distance between the measurement unit and the white reference plate when the light-emitting unit irradiates light to the white reference plate, and
wherein the correction unit corrects the amount of emitted light of the light-emitting unit according to the distance measured by the distance measuring unit when the light-emitting unit irradiated the measurement image with light.

13. The image forming apparatus according to claim 1,
wherein, in a case where the light-emitting unit irradiates light to the measurement image, the receiving unit receives a reflected light from the measurement image and outputs a first data,
wherein, in a case where the light-emitting unit irradiates light to the white reference plate, the receiving unit receives a reflected light from the white reference plate and outputs a second data, and
wherein the measurement unit calculates the spectral reflectance based on the first data output from the receiving unit and the second data output from the receiving unit.

\* \* \* \* \*